(12) United States Patent
Zopf

(10) Patent No.: US 9,291,523 B2
(45) Date of Patent: Mar. 22, 2016

(54) AUTOMATED DIAGNOSTICS FOR CRAWLER TRANSMISSION HYDRAULIC CIRCUITS

(75) Inventor: William Damm Zopf, Dubuque, IA (US)

(73) Assignee: Deere & Company, Moline, IL (US)

( * ) Notice: Subject to any disclaimer, the term of this patent is extended or adjusted under 35 U.S.C. 154(b) by 2317 days.

(21) Appl. No.: 11/890,604

(22) Filed: Aug. 7, 2007
(Under 37 CFR 1.47)

(65) Prior Publication Data

US 2009/0043442 A1    Feb. 12, 2009

(51) Int. Cl.
| | |
|---|---|
| G01M 17/00 | (2006.01) |
| G06F 7/00 | (2006.01) |
| G06F 19/00 | (2011.01) |
| G06F 7/70 | (2006.01) |
| G06G 7/00 | (2006.01) |
| G06F 7/76 | (2006.01) |
| G06F 17/00 | (2006.01) |
| G01M 13/02 | (2006.01) |
| G01M 3/28 | (2006.01) |

(52) U.S. Cl.
CPC ............ *G01M 13/02* (2013.01); *G01M 3/2846* (2013.01)

(58) Field of Classification Search
USPC .......................................... 701/31.4, 50, 51
See application file for complete search history.

(56) References Cited

U.S. PATENT DOCUMENTS

| | | | |
|---|---|---|---|
| 4,362,055 A | 12/1982 | Grobler | |
| 4,368,638 A | 1/1983 | Groves et al. | |
| 4,773,261 A | 9/1988 | Cantrell | |
| 4,967,544 A | 11/1990 | Ziegler et al. | |
| 5,512,890 A * | 4/1996 | Everson et al. | 340/870.13 |
| 6,192,302 B1 * | 2/2001 | Giles et al. | 701/29.6 |
| 6,323,656 B2 | 11/2001 | Shoemaker | |
| 6,470,247 B1 | 10/2002 | Meyer et al. | |
| 2002/0077780 A1 * | 6/2002 | Liebl et al. | 702/183 |
| 2003/0182085 A1 * | 9/2003 | Quinnett et al. | 702/185 |
| 2005/0059521 A1 * | 3/2005 | Funato et al. | 475/73 |
| 2007/0021895 A1 * | 1/2007 | Brandt et al. | 701/50 |

* cited by examiner

*Primary Examiner* — Imran Mustafa
(74) *Attorney, Agent, or Firm* — Faegre Baker Daniels, LLP.

(57) ABSTRACT

A diagnostic system and method for diagnosing problems in a hydrostatic transmission of a vehicle including a transmission control unit that has a monitor and pressure sensors and at least one temperature sensor connectable between diagnostic hose ports coupled to the transmission and inputs on the transmission control unit. A symptom or problem area is selected on the monitor; and a test sequence is initiated by command input on the monitor. The transmission control unit performs calculations based upon input data from the pressure sensors to determine a hydraulic problem, and provides directions for adjustments or replacing parts on the hydrostatic transmission. The monitor may provide instructions to relocate existing sensor connections for the test sequence selected.

34 Claims, 5 Drawing Sheets

AUTOMATED DIAGNOSTICS FOR CRAWLER TRANSMISSION HYDRAULIC CIRCUITS

BACKGROUND OF THE INVENTION

This invention relates to diagnostic testing of a hydrostatic transmission, and in particular, to an automated diagnostic system that can run tests that would normally be conducted manually by a technician.

Diagnosing problems in a hydrostatic transmission can be a tedious and ambiguous task. In order to ascertain if particular components are functioning properly, a technician typically installs a variety of pressure or flow gauges, taps into the electrical circuits, and then follows testing procedures. The testing procedures include making notes and performing calculations to try to ascertain that the individual components are functioning properly. Such tests can also be subjective and highly dependent upon the skills and dedication of the technician to following procedures.

Another problem with current testing techniques is that, as the technician may be uncertain as to the real cause of a problem, a parts-swapping approach may be taken to pick and choose parts to replace until the appropriate nonfunctioning part is removed. This type of approach can significantly increase warranty costs as non-defective parts may be replaced.

Accordingly, it is an object of the present invention to automate diagnostics of transmission hydraulic components. It is a further object of the invention to allow a technician to select customer complaints from an existing monitor so that the monitor can instruct the technician to relocate existing pressure transducers already on the crawler and to do a "run test" on the monitor.

It is another object of the present invention to drive appropriate electrical signals to control the transmission hydraulic components while the microprocessor reads resulting speeds and pressures. A further object of the invention is that the microprocessor can perform calculations on the results, determine the hydraulic problem, and provide feedback to the technician on adjustments for part replacements that need to be made.

Additionally, it is a goal that the hydraulic test system not require any testing devices beyond those currently existing on the crawler. This eliminates the need for coordinating separate laptops or diagnostic tools or boxes. In addition, as the method is designed to use an on-board transmission microprocessor, test data are embedded in the crawler itself, which eliminates confusion about which test results or values apply to the specific model. The subject invention should avoid the need to consult a service manual and eliminate mistakes inherent with such a procedure.

It is believed that such hydraulic test procedures will significantly reduce the time required to perform a test. Also, the testing process should be more repeatable and valid by removing subjectivity from the results. One way to accomplish this is using the on-board microprocessor to electronically simulate a technician moving levers and changing speeds as required with current tests.

An additional object of the invention is to allow the automated tests to factor in other factors to the test results. For example, temperature could be continuously monitored and factored into the test results while the test is being conducted. It is believed that more parameters are available to be monitored by the microprocessors than can be monitored by a technician using pressure gauges and voltmeters.

SUMMARY OF THE INVENTION

In one embodiment of the invention, a diagnostic system for diagnosing problems in a hydrostatic transmission of a vehicle is provided, wherein the diagnostic system includes: a transmission control unit having computational and time-keeping capabilities; a monitor with input capabilities connected with the transmission control unit and including a selection of symptoms or problem areas, which may be selected by an operator; and a plurality of pressure sensors having leads being connectable to inputs on the transmission control unit, the pressure sensors being relocatable to transmission control unit inputs based upon instructions to the operator in accordance with the symptom or problem area selected, and the transmission control unit performing calculations on data received from the sensors to determine the hydraulic problem and provide information readable on the monitor for the operator to make adjustments or replace parts.

The diagnostic system further includes diagnostic test ports to which the pressure sensors can be connected. The diagnostic system may also include a hydrostatic integrated circuit manifold containing the diagnostic test ports for the hydrostatic transmission. The pressure sensors may have an accuracy of ±0.3% typically, and ±1% maximum at full scale.

The monitor selections may include a selection menu that includes a "test" selection, and selecting "test" on the menu generates a screen where symptoms or problem areas may be selected.

The diagnostic system may include automated test sequencing for warm-up, power and efficiency, charge pressure, motor shifts, and pumps and motor tests. The park brake and cooler bypass operation are checked in the warm-up test sequence; multifunction relief check, transmission efficiency tests, engine low power tests, and cooling capacity check are checked in the power and efficiency test sequence; neutral charge for relief pressure, operating charge relief pressure, and minimum charge releasing pressure are checked in the charge pressure test sequence; hydrostatic motor minimum/maximum angle and motor displacement control valve are checked in the motor shifts test sequence; and a pressure control pilot test, a pump servo pressure test, and pump displacement control valve null adjustment are tested in the pumps and motors sequence.

The diagnostic system performs tests that are normally done manually, and diagnoses problems in the hydrostatic transmission using tools and devices that are already present on the vehicle. The transmission control unit may provide both input prompts and repair information based upon the command inputs and sensor data without the need to reference external documents or use external devices. The vehicle is a crawler.

In another embodiment of the invention, a method for diagnosing problems in a hydrostatic transmission of a vehicle includes the steps of: providing a hydrostatic transmission, a transmission control unit that includes a monitor and pressure sensors connectable between diagnostic hose ports coupled to the transmission and inputs on the transmission control unit; selecting a test function on the monitor; selecting a symptom or problem area on the monitor; initiating a test sequence by command input on the monitor; performing calculations in the transmission control unit based upon input data from the pressure sensors to determine a hydraulic problem; and providing directions for adjustments or replacing parts on the hydrostatic transmission.

The method for diagnosing problems may further include the step of relocating existing pressure sensor connections. The monitor can provide instructions for relocating the pressure sensors based upon the symptom or problem area selected, selecting the "test" selection on the monitor generates the list of symptoms and problem areas for selection, and the steps can be performed using tools and devices that are part of the normal operation of the vehicle. The transmission control unit can provide adjustment and repair information based upon the command inputs and sensor data without the need to reference external documents or use external devices. A hydrostatic integrated circuit manifold may be provided with diagnostic test ports coupled to the hydrostatic transmission, and the method for diagnosing problems in a hydrostatic transmission may further include the step of providing at least one temperature sensor for sensing the hydrostatic transmission oil temperature.

The method for diagnosing problems in a hydrostatic transmission may also include the step of testing the warm-up sequence of the vehicle, and the park brake, the hydrostatic transmission oil, and the cooler bypass operation can all be tested as part of the warm-up test sequence.

The method may also include the test sequence of checking the power and efficiency of the hydrostatic transmission, and multifunction relief, transmission efficiency, engine lower power, and cooling capacity can all be tested as part of the power efficiency test sequence.

The method may further include the testing sequence of testing the charge pressure, and the neutral charge relief pressure, the operating relief pressure, and the minimum charge pressure can all be tested as part of the charge pressure test sequence.

The method may also include the test sequence of checking the motor shifts of the hydrostatic transmission, and hydrostatic motor minimum and maximum angle and motor displacement control valve can be tested as part of the motor shift test sequence.

The method may additionally include the test sequence of checking the pumps and motors of the hydrostatic transmission, and pressure control pilot, pump servo pressure, and pump displacement control valve null adjustment can all be tested as part of the pumps and motors test sequence.

In another embodiment of the invention, a method for diagnosing problems in a hydrostatic transmission of a vehicle is provided that includes the steps of: providing a hydrostatic transmission, a transmission control unit that includes a monitor capable of receiving command inputs from an operator and pressure sensors and at least one temperature sensor connectable between diagnostic hose ports coupled to the transmission and inputs on the transmission control unit; selecting a symptom or problem area to be checked on the monitor; initiating a test sequence by command on the monitor; providing sensor data inputs to the transmission control unit; having the transmission control unit perform calculations based upon the sensor data inputs to determine a hydraulic problem; and providing directions for adjustments or replacing parts on the hydrostatic transmission.

The method for diagnosing problems may further include the step of relocating existing pressure sensor connections. The monitor can provide instructions for relocating the pressure sensors based upon the symptom or problem area selected on the monitor.

BRIEF DESCRIPTION OF THE DRAWINGS

The above-mentioned and other features and objects of this invention and the manner of obtaining them will become more apparent and the invention itself will be better understood by reference to the following description of embodiments of the present invention taken in conjunction with the accompanying drawings, wherein.

Figure 1:
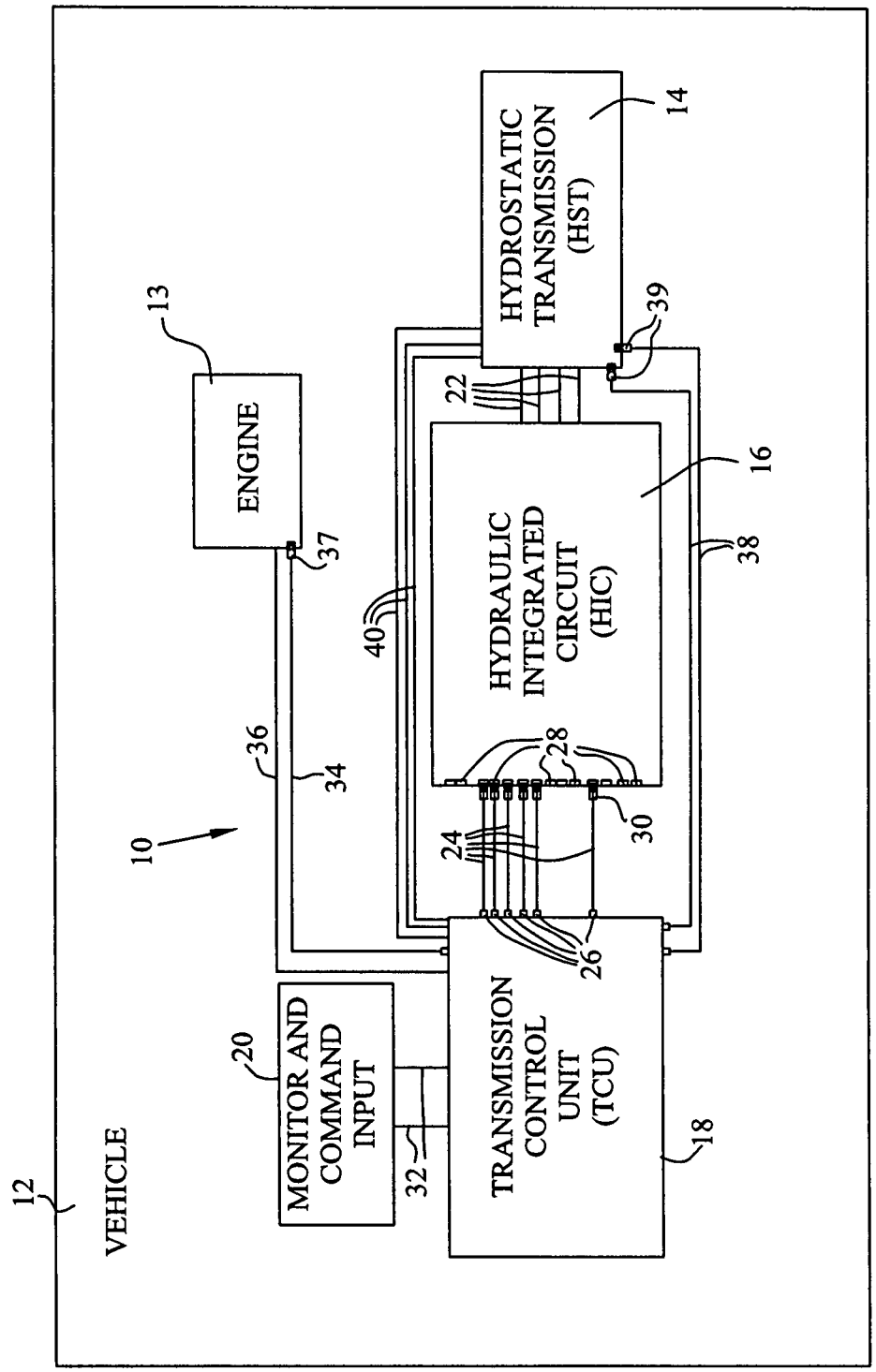
FIG. 1 is one embodiment of the present invention of a vehicle having a hydrostatic transmission and a diagnostic system for diagnosing problems in the hydrostatic transmission.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF EMBODIMENTS OF THE INVENTION

For the purposes of promoting an understanding of the principles of the invention, reference will now be made to the embodiments illustrated in the drawings, which are described below. It will nevertheless be understood that no limitation of the scope of the invention is thereby intended. The invention includes any alterations and further modifications in the illustrated devices and described methods and further applications of the principles of the invention, which would normally occur to one skilled in the art to which the invention relates.

Now referring to FIG. 1, one embodiment of a diagnostic system for diagnosing problems in a hydrostatic transmission is shown, generally indicated as 10. Diagnostic system 10 is mounted on a vehicle 12. Vehicle 12 includes an engine 13, a hydrostatic transmission 14, a hydraulic integrated circuit 16, a transmission control unit 18, and a monitor with command input 20. In addition, vehicle 12 includes hydraulic couplings 22 between the hydrostatic transmission and hydraulic integrated circuit and electrical couplings 24 between transmission control unit 18 and hydraulic integrated circuit 16. Couplings 24 are coupled to respective inputs 26 on the transmission control unit 18, and are coupled to respective diagnostic ports 28 on hydraulic integrated circuit 16. Connected to couplings 24 and adjacent diagnostic ports 28 are sensors or transducers 30. Vehicle 12 also includes electrical connections 32 between the transmission control unit and monitor/command input 20 of diagnostic system 10.

Vehicle 12 and diagnostic system 10 further include at least one electrical coupling 34, between transmission control unit 18 and engine 13. Coupling 34 includes a transducer or sensor 37 connected to a diagnostic port of the engine. Additionally, at least one electrical control line 36 is connected between engine 13 and transmission control unit 18 so that the transmission control unit can control aspects of the engine as discussed below. Furthermore, one or more electrical couplings 38 may be coupled between transmission control unit 18 and hydrostatic transmission 14 for direct monitoring of components, such as transmission motors; and transducers or sensors 39 are mounted between the couplings and diagnostic ports on transmission 14. Additionally, transmission control unit 18 includes one or more electrical control lines 40 connecting transmission control unit 18 to the hydrostatic transmission to control operational aspects thereof, as discussed below.

Vehicle 12 may be of a common work-type vehicle, such as a crawler, as is known. Similarly, engine 13 and hydrostatic transmission 14 are of the type commonly known and used on a work vehicle, such as a crawler. Hydraulic integrated circuit 16 is provided to allow convenient relocation of couplings 24 to diagnostic ports of the hydrostatic transmission. Transmission control unit 18 is similar to that which has been previously included in the subject vehicle 12, with modifications to allow automated diagnostic testing described herein. Similarly, monitor/command input 20 is known and has been used on vehicles such as applicant's crawlers.

Hydraulic integrated circuit 14 may typically include about fourteen diagnostic ports, although more or less may be included as required based upon the specific hydrostatic transmission and application. It should be noted that the number of inputs and diagnostic ports on the components in FIG. 1 are for representative purposes only, and are not intended to represent any specific number of inputs, couplings, or ports. Examples of support functions related to the diagnostic ports on the hydraulic integrated circuit include charge oil filter, charge filter bypass relief valve, charge filter bypass pressure switch, neutral charge release valve, charge presser sensor, case oil temperature sensor, case pressure sensor, electro-hydraulic controlled cooler bypass valve, hand pump for cab tilt and parking brake release, hand valve to select between cab tilt and parking brake release, hand valve tool to select between cab raised/lowered, cab tilt hand pump relief valve, parking brake hand pump relief valve, shuttle check for brake pressure source, electro-hydraulic parking brake valve(s), and transmission plumbing ports. The sensors are of a type that depend upon the diagnostic port to which it is connected. Sensors 30 include a plurality of pressure transducers/sensors, motor speed sensors, and temperature sensors. Sensor 37 attached to coupling 34 may be an engine rpm sensor. Electrical control lines 36 and 40 are used to allow the transmission control unit to control aspects of the components, such as the engine speed in engine 13 and forward neutral or reverse settings in hydrostatic transmission 14.

Figure 2:
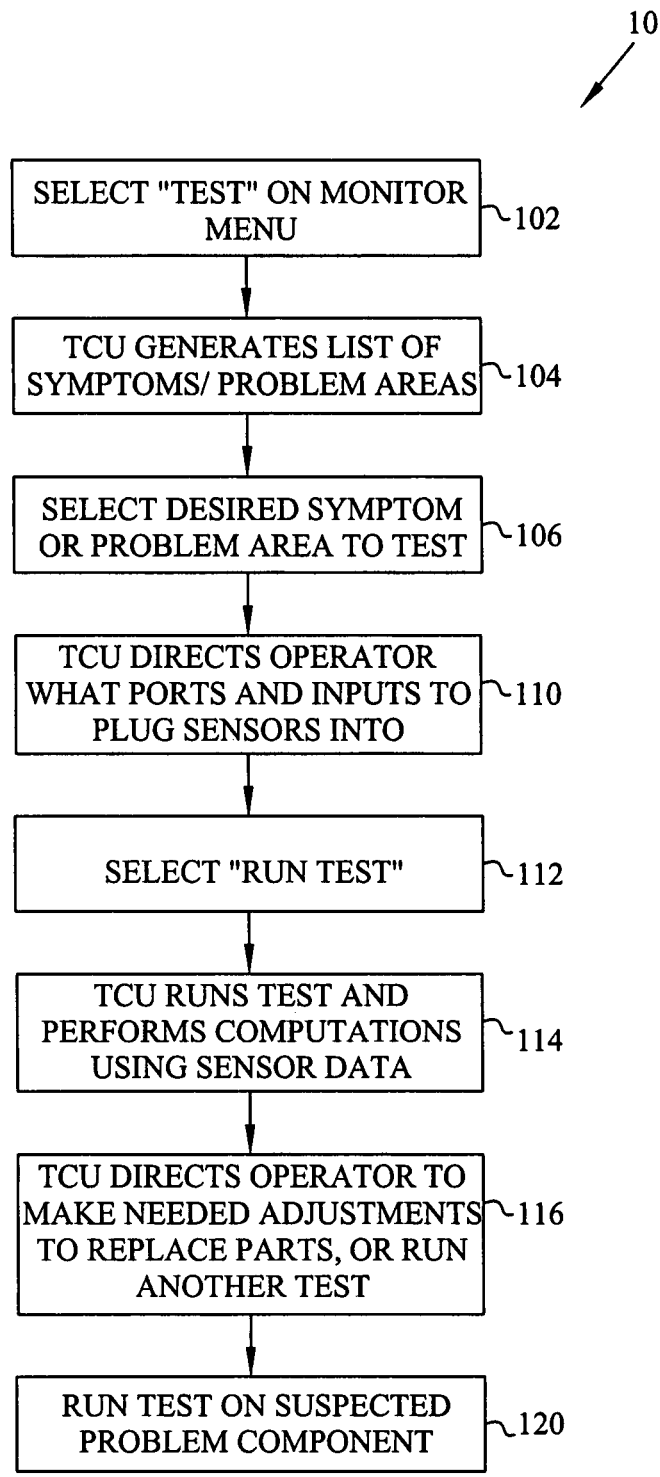
FIG. 2 is a flow chart of one embodiment of a diagnosing sequence for the diagnostic system of FIG. 1.

Diagnostic system 10 is used to diagnose problems in hydrostatic transmission 14 that had to be diagnosed manually. One embodiment of the process in which diagnostic system 10 functions is illustrated is in the flow chart of FIG. 2. The automated diagnostics is initiated by an operator selecting "test" or similar term from a menu displayed on monitor 22 using the appropriate command input (step 102). The transmission control unit then generates a list of symptoms or problem areas on which the operator would like to perform a diagnosis (step 104). The operator then selects a desired symptom or problem area to be tested, (step 106) and the transmission control unit directs the operator which ports and inputs to plug sensors 30 and electrical couplings 24 into (step 110). After the appropriate connections of the electrical couplings and sensors are made, the operator selects "run test" or similar term as displayed on the monitor using the command input to initiate the diagnostic test sequence (step 112). The transmission control unit 18 then performs the requested test sequence and performs computations using input data from the sensors (step 114), and the transmission control unit provides information on monitor 20 directing the operator to make any needed adjustments, replace parts or run another test to check a suspect component (step 116). If required, the operator then runs a test on the suspect component identified by the transmission control unit using a sequence similar to that described above (step 120).

Figure 3:
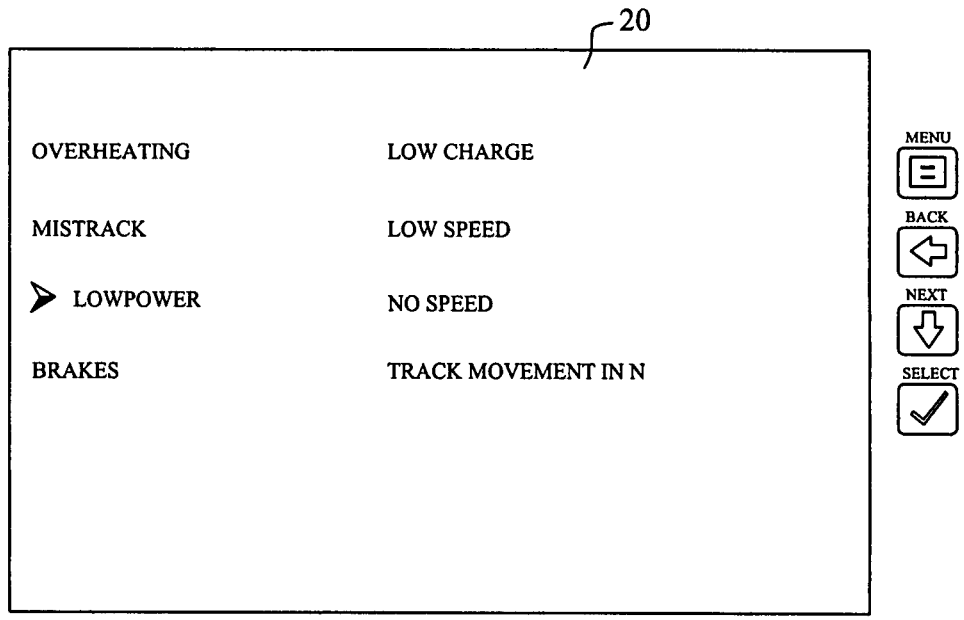
FIG. 3 is a schematic diagram of a display on a monitor and command inputs with an operator selecting the symptom of "Low Power" from the menu on the monitor display.
Figure 4:
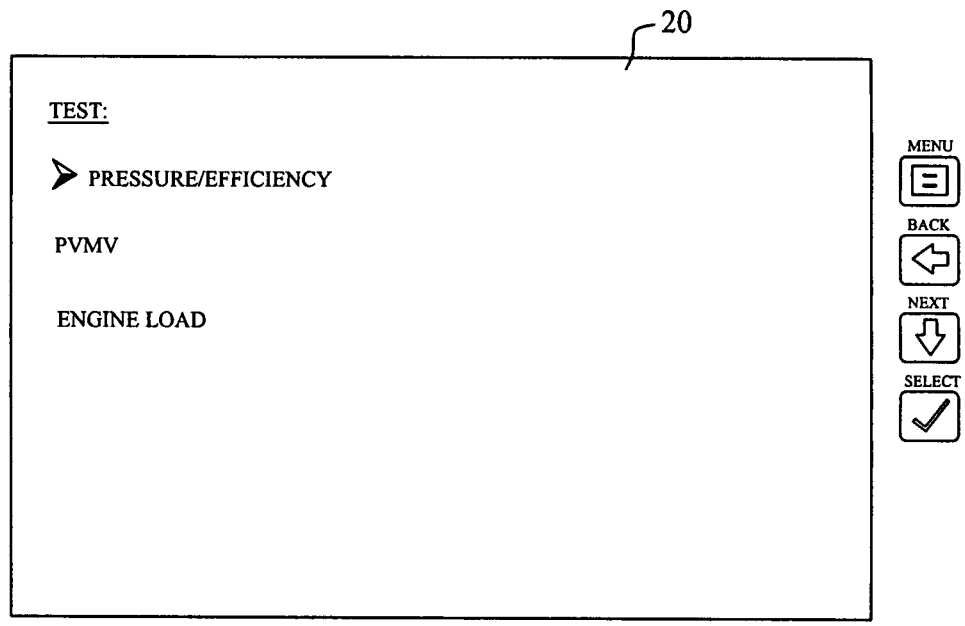
FIG. 4 is a schematic diagram of the monitor display and command inputs showing a test sequence being conducted with a suggested area being selected to check for the symptom of "Low Power"
Figure 5:
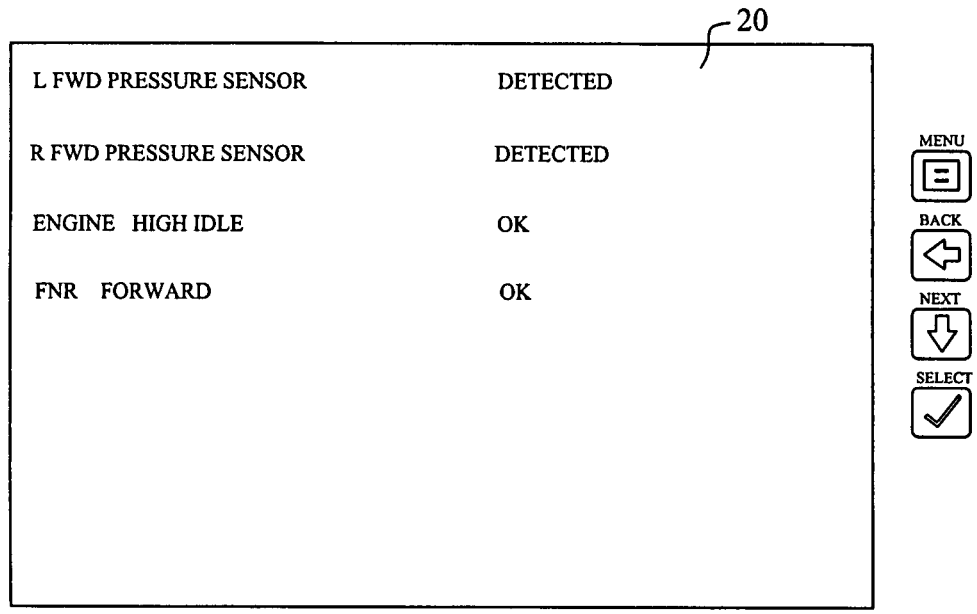
FIG. 5 is a schematic diagram of the monitor display and command inputs showing a test sequence being conducted.

Now referring to FIGS. 3-8, a sample test sequence as viewed and selected on monitor 20 is shown. In this test sequence, the operator believes that vehicle 20 has a problem with low power. The operator selects to run a test on the command inputs of monitor 20, and the monitor displays a menu as shown in FIG. 3 with a list of complaint or problem areas. In this case, the operator selects "Low Power" using the command inputs adjacent the monitor display. The transmission control unit lists areas that can be checked for a low power condition (FIG. 4). In the embodiment shown, the area of pressure/efficiency, pumps and motors displacement (pvmv), and engine load comprise the list of areas to be checked. The operator selects first to run a test sequence on the pressure/efficiency. Accordingly, the transmission control unit 18 will initiate the test sequence as shown on the monitor display in FIG. 5. Please note that the operator or technician will perform certain functions to assist with the test sequence. In this particular test sequence, the operator is setting the engine idle at high and the transmission in the forward position. The operator's commands to the engine and transmission are transmitted over electrical control lines 36 and 40, respectively.

The transmission control unit then performs computations based upon data from the sensors and compares the test data to ranges or limits that have been pre-selected and entered into the transmission control unit. Computations are made using standard algorithms and equations.

Figure 6:
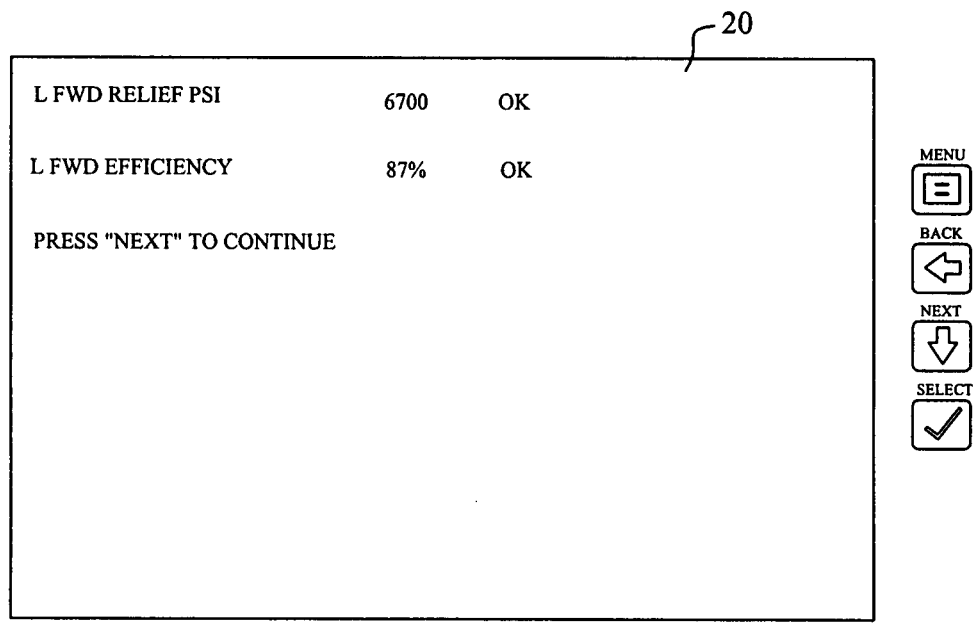
FIG. 6 is a schematic diagram of the monitor display and command inputs showing the test sequence being continued.
Figure 7:
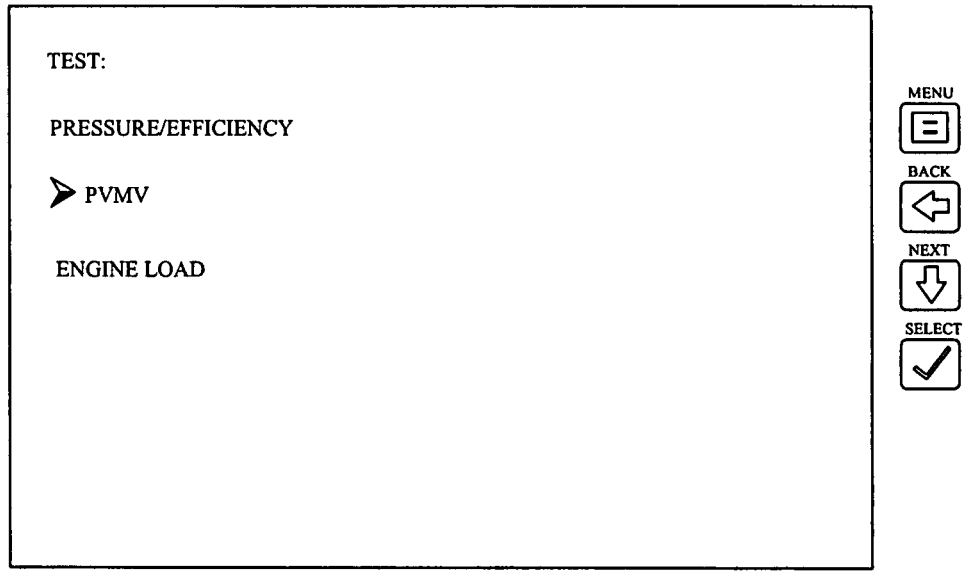
FIG. 7 is a schematic diagram of the monitor display and command inputs showing a test sequence being conducted with another suggested area being selected to check for the symptom of "Low Power"
Figure 8:
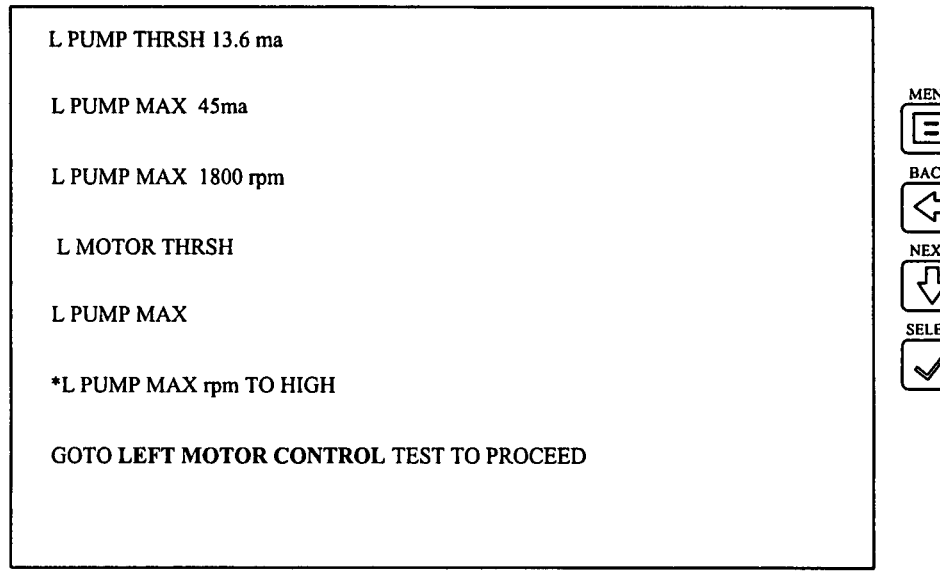
FIG. 8 is a schematic diagram of the monitor display and command inputs showing a test sequence being conducted and the results of the test sequence with the transmission control unit directing the operator to run a test on a suspect component.

The results of the pressure/efficiency test are displayed in FIG. 6 and are termed to be satisfactory, so that the transmission control unit prompts the operator to continue testing in another area. Now referring to FIG. 7, the operator has chosen to select the pumps and motors displacement area for the next test. The transmission control unit performs a test sequence, and the results are shown in FIG. 8. In this particular example, the transmission control unit has determined that the left pump maximum rpm's is too high, and has instructed the operator to proceed with a test of the suspect left motor control. A sequence similar to that shown would then be conducted for the left motor control. It should be noted that running the test sequence on the left motor or other components may require the operator to connect sensors 39 to ports located directly on hydrostatic transmission 14 if the electrical couplings and sensors are not already connected thereto. It should be appreciated that isolating the "Low Power" complaint to the left motor control can be performed in an expeditious manner using the subject automated diagnostic invention and save considerable time over performing manual tests to check the pump efficiency, relief pressures, and pump and motor displacement areas.

An advantage of the subject invention is that the transmission control unit can simultaneously be controlled while monitoring pressures during the automated testing sequence. It is also contemplated that grouping a series of tests together, such as those for pressure and efficiency, pump and motor displacements, and engine load as shown in FIG. 4, optimizes the functionality of testing and utilizing transducer locations while minimizing relocating transducers. In one embodiment, groupings of test sequences can include warm-up, power and efficiency, charge pressure, motor shifts, and pumps and motors. The warm-up test sequence group can include checking the parking brake by loading the pumps, transmission oil, temperature by loading the pumps, and checking the cooler by-pass operation. The power and efficiency grouping test sequence may include a multifunctional relief check, a transmission efficiency test, an engine low power test, and a cooling capacity check. The charge pressure test sequence can include testing for checking the neutral charge relief pressure, the operating charge relief pressure, and the minimum charge pressure. The motor shifts test sequence can include checking the hydrostatic motor minimum and maximum angles and operation of the motor displacement control valve. The pumps and motors test sequence can include a pressure control pilot test, pump servo pressure test, and pump displacement control valve null adjustment test.

An example of a test sequence performed for the warm-up group is shown in Table 1 (wherein the left column shows the designation viewable on the display of the monitor and the right column indicates the input to be selected on the monitor or other operation to be performed by the technician):

TABLE 1

| Display on Monitor | Key (Selected on monitor by technician or other operation performed on vehicle by technician as noted) |
|---|---|
| Run | Menu |
| Diag | Menu |
| Test | Select |
| X1** | Next (X1 already calibrated for this example 500 psi in pump case port) |
| X2** | Next |
|  | Select |
| EngH* | Technician sets engine at Wide-Open-Throttle (WOT) |
| FWD* | Technician moves transmission control (FNR) to forward |
|  | TCU begins loading transmission against brakes per warm up procedure |
|  | If motor ppu's show more than zero rpm Park brake service code set |
|  | At the low bypass valve opening spec ex 135 F. case pressure is recorded and compared to spec (ex 18-24 psi). Pressure and temperature continue to be monitored until either pressure reaches open bypass spec (ex 45-60 psi) or temperature exceeds open bypass spec (ex 180 F.) |
| Neut* | Technician moves (FNR) to neutral |
| EngL* | Technician sets engine at low idlePbrk* |
| OK* | Technician notes brakes are able to hold crawler to relief |
| BYPS |  |
| 143 F. |  |
| OK* | Technician notes bypass opens at 143 F. which is within spec |

*Operation, other than inputing a command on monitor, which is performed by technician.
**X1 and X2 are pressure transducers 1 and 2, respectively.

To perform the warm-up test, the engine is started and the parking brake is on. Running the test sequence requires a few commands and little input by the operator. The software is programmed to run the tests and includes the limits for bypass pressure and temperature range for the subject model of vehicle being tested and to interpret the results and provide a display readout.

An example of a test sequence for the power and efficiency grouping is shown in Table 2:

TABLE 2

| Display on Monitor | Key (Selected on monitor by technician or other operation performed on vehicle by technician as noted) |
|---|---|
| Start engine, park brake on |  |
| Run | Menu |
| Diag | Menu |
| Test | Select |
| X1** | Next (X1 already calibrated for this example) |
| X2** | Next (X2 already calibrated for this example) |
| 11 | Next |
| 20 | Next |
| 30 | Next |
| EngH* | Technician sets engine at WOT |
| Fwd* | Technician moves (FNR) to forward |
| Neut* | Technician moves transmission (FNR) to neutral |
| EngL* | Technician sets engine at low idle |
| Test/Done |  |
| Pbrk |  |
| OK* | Technician brakes are able to hold crawler to relief |
| LPmP |  |
| Relf |  |
| 6250 |  |
| OK* | Technician notes left fwd relief pressure is within spec at 6250 psi |
| Push/Next* |  |
| LPmP |  |

TABLE 2-continued

| Display on Monitor | Key (Selected on monitor by technician or other operation performed on vehicle by technician as noted) |
|---|---|
| Eff | Technician notes left fwd efficiency is 8 ma over threshold |
| Good | Technician notes this efficiency is within service spec |
| Push/Next* |  |
| RPmP |  |
| Relf |  |
| 6250 |  |
| OK | Technician notes right fwd relief pressure is within spec at 6250 psi |
| Push/Next* |  |
| RPmP |  |
| Eff |  |
| 6 | Technician notes right fwd efficiency is 6 ma over threshold |
| Good | Technician notes this efficiency is within service spec |

TABLE 2-continued

| Display on Monitor | Key (Selected on monitor by technician or other operation performed on vehicle by technician as noted) |
|---|---|
| Push/Next* | |
| Eng | |
| PWR | |
| Good | Technician notes engine power is acceptable |
| Push/Next* | |
| Cool | |
| Bad | Technician notes cooling system under performing |

*Operation, other than inputting a command on monitor, which is performed by technician.
**X1 and X2 are pressure transducers 1 and 2, respectively.

After the technician sets the engine at the wide open throttle and the transmission to the forward position, the transmission control unit 14 takes over running the test. Additionally, transmission control unit can continually monitor the motor during testing and a zero pump current could be interpreted as worn brakes. It should also be noted that transmission control unit will automatically warm the hydrostatic transmission fluid to an operating temperature by providing pump current for the warm-up procedure and loading against the brakes. During such a sequence, the display on monitor 20 can flash warm-up/warm-up. Then, the left pump current can be slowly ramped up by loading the left hydrostatic loop against the brake. For example, the pressure can be read at each 1 milliamp (mA), as read on a known gauge or other known means of detection, increment and compared to the previous pressure. After four consecutive pressure readings within 100 psi of each other, pressure can be written to memory as the left forward relief pressure. The transmission control unit 14 can then slowly decrease the pump current draw until the pressure drops to 5,000 psi and record the pump current draw measured in mA for the efficiency test. The right pump is evaluated in a similar manner. Once the transmission efficiency and relief are known, the transmission control unit can ramp up both pump currents, for example, in 5-mA increments, measure the engine speed drop, factor in efficiencies, determine if the engine power is acceptable. The cooling capacity can be measured by knowing the relative engine power and pump efficiencies and then sending out current required, for example, 5,000 psi on both pumps, and recording the time for the hydrostatic transmission temperature to rise by a given amount (such as 40° F.). If the time for the temperature to rise is too short, this would indicate a cooling system problem. The cooling system capacity sequence is initiated in Table 2 when the technician moves the transmission control to neutral.

The above sequence enables the technician to measure relief pressure, pump efficiency, relative engine power, cooling system and brake conditions by connecting the hydraulic quick connects and plugging in electrical connectors as instructed by the transmission control unit and using the menu selections on the monitor display. Diagnostic test sequencing does not require the need to remove the floor plate, disconnect park brakes, consult a manual for test procedure specifications, or rely on the technician's interpretation of the test results, as is required for manual testing.

A sample test sequence for the charge pressure grouping is illustrated in Table 3:

TABLE 3

| Display on Monitor | Key (Selected on monitor by technician or other operation performed on vehicle by technician as noted) |
|---|---|
| Run | Menu |
| Diag | Menu |
| Test | Select |
| X1** | Select |
| 500 | Select TCU calibrates 500 psi transducer on X1 |
| | Start engine, park brake on |
| Run | Menu |
| Diag | Menu |
| Test | Select |
| X1** | Next (X1 already calibrated for this example) |
| X2** | Next (X2 already calibrated for this example) |
| 10 | Next |
| 20 | Next |
| 30 | Next |
| 50 | Select |
| EngH* | Technician sets engine at WOT |
| Warm/up | TCU warms up HST oil and checks park brake |
| Fwd* | Technician moves (FNR) into fwd |
| | TCU ramps up pumps and records operating charge pressure |
| | TCU ramps up pumps, loads engine to 1300, records min charge |
| Neut* | Technician moves (FNR) into neutral |
| | TCU records neutral charge pressure |
| EngL* | Technician sets engine at low idle |
| Nchg | |
| 320 | |
| Good | TCU compares to service spec |
| Push/next* | Technician pushes next |
| Ochg | |
| 295 | |
| Good | TCU compares delta to neutral charge |
| Push/next* | Technician pushes next |
| Min | |
| Chg | |
| 210 | |
| Good | TCU compares to spec (190 psi for H) |

*Operation, other than inputting a command on monitor, which is performed by technician.
**X1 and X2 are pressure transducers 1 and 2, respectively.

To perform this test, the technician installs one of the 0-500 psi pressure sensors 30 on a charge pressure diagnostic port 28 and plugs the sensor into the appropriate electrical connector 24. For the charge pressure test, the key is on but the engine is not running. The above charge pressure test can be accomplished without removing floor plates, bypassing brakes, or consulting a service manual.

An example test sequence for C series motor shift threshold is illustrated in Table 4:

TABLE 4

| Display on Monitor | Key (Selected on monitor by technician or other operation performed on vehicle by technician as noted) |
|---|---|
| Start engine, park brake on | |
| Run | Menu |
| Diag | Menu |
| Test | Select |
| X1** | Next (X1 already calibrated for this example LT motor servo) |
| X2 * 8 | Next (X2 already calibrated for this example RT motor serv0) |
| 40 | Select |
| EngH* | Technician sets engine at WOT |
| FWD* | Technician moves (FNR) to forward |
| LMtr | |
| Thrs | |
| 61 | |
| Good | Technician notes left motor threshold at 61 mA is in spec |

TABLE 4-continued

| Display on Monitor | Key (Selected on monitor by technician or other operation performed on vehicle by technician as noted) |
|---|---|
| OK Push Next* | |
| RMtr | |
| Thrs | |
| 49 | |
| Low | Technicians notes right motor threshold at 49 mA is low |
| Adjst | |
| In | |
| 1.5 | |
| turn | Technician is advised to adjust motor displacement control in 1.5 turns and could then repeat test to verify operation ok. |

*Operation, other than inputing a command on monitor, which is performed by technician.
**X1 and X2 are pressure transducers 1 and 2, respectively.

In the above testing sequence, the transmission control unit takes over running the test after the technician moves the transmission control to forward. The current is then ramped up until a pressure change is seen on the servo and the current is recorded.

An example of a testing sequence for the pumps and motors group is illustrated in Table 5:

TABLE 5

| Display on Monitor | Key (Selected on monitor by technician or other operation performed on vehicle by technician as noted) |
|---|---|
| Start engine, park brake on | |
| Run | Menu |
| Diag | Menu |
| Test | Select |
| X1** | Next (X1 already calibrated for this example 500 psi Left Front PCP) |
| X2** | Next (X2 already calibrated for this example 500 psi Left Rear PCP) |
| 50 | Select |
| 51 | Select Technician has selected PCP test |
| EngH* | Technician sets engine at WOT At this point TCU takes over running test and measure neutral delta pressure. TCU could then ramp up current and measure control pressure at various mA |
| Example #1 | |
| Lpmp | |
| PCP | |
| Good | Technician notes this PCP meets both null and linearity specs |
| Example #2 | |
| Lpmp | |
| Bad | |
| Null | Technician notes this PCP does not meet null spec but is within |
| Turn | readjustment range and screws in 2.0 turns and rechecks. |
| 2.0 | |
| in | |
| Example #3 | |
| Lpmp | |
| Bad | |
| Null | |
| Repl | Technician notes null bad and PCP needs to be replaced. |

*Operation, other than inputing a command on monitor, which is performed by technician.
**X1 and X2 are pressure transducers 1 and 2, respectively.

After the technician sets the engine at wide open throttle, the transmission control unit 14 takes over running the test and measuring the neutral valve pressure. The transmission control unit can then ramp up a current and measure control pressure at various mA's. The measurement of pressure by means of electrical current will be understood as the result of pressure transducers that convert sensed pressure of transmission hydraulic fluid to electrical current. The measured current converted by algorithm for a digital or analog display to the operator, or used by the transmission control unit for diagnostic purposes as explained and claimed herein.

While the invention has been taught with specific reference to these embodiments, one skilled in the art will recognize that changes can be made in form and detail without departing from the spirit and scope of the invention. The described embodiments are to be considered, therefore, in all respects only as illustrative and not restrictive. As such, the scope of the invention is indicated by the following claims rather than by the description.

The invention claimed is:

1. A method for diagnosing problems in a hydrostatic transmission of a vehicle, comprising the steps of:
providing a hydrostatic transmission, a transmission control unit that includes a monitor capable of receiving input commands and pressure sensors connectable between diagnostic hose ports coupled to the transmission and inputs on the transmission control unit;
selecting a test function on the monitor;
selecting a symptom or problem area on the monitor;
initiating a test sequence by input command on the monitor;
performing calculations in the transmission control unit based upon data from the pressure sensors to determine a hydraulic problem; and
providing directions for adjustments or replacing parts on the hydrostatic transmission.

2. The method for diagnosing problems as set forth in claim 1, including the step of relocating existing pressure sensor connections.

3. The method for diagnosing problems in a hydrostatic transmission as set forth in claim 2, wherein the monitor provides instructions for relocating the pressure sensors based upon the symptom or problem area selected.

4. The method for diagnosing problems in a hydrostatic transmission as set forth in claim 1, wherein selecting a "test" selection on the monitor generates a list of symptoms or problem areas for selection.

5. The method for diagnosing problems in a hydrostatic transmission as set forth in claim 1, wherein the steps are performed using tools and devices that are part of the normal operation of the vehicle.

6. The method for diagnosing problems in a hydrostatic transmission as set forth in claim 5, wherein the transmission control unit provides both adjustments and repair information based upon the input commands and sensor data without the need to reference external documents or use external devices.

7. The method for diagnosing problems in a hydrostatic transmission as set forth in claim 1, further including the step of providing a hydrostatic integrated circuit manifold with diagnostic test ports coupled to the hydrostatic transmission.

8. The method for diagnosing problems in a hydrostatic transmission as set forth in claim 1, further including the step of providing at least one temperature sensor for sensing the hydrostatic transmission oil temperature.

9. The method for diagnosing problems in a hydrostatic transmission as set forth in claim 8, including a warm-up test sequence.

10. The method for diagnosing problems in a hydrostatic transmission as set forth in claim 9, wherein a park brake, hydrostatic transmission oil, and a cooler bypass operation can all be tested as part of the warm-up test sequence.

11. The method for diagnosing problems in a hydrostatic transmission as set forth in claim 8, including the test sequence of checking power and efficiency of the hydrostatic transmission.

12. The method for diagnosing problems in a hydrostatic transmission as set forth in claim 11, wherein a multifunction relief, a transmission efficiency, engine lower power, and cooling capacity can all be tested as part of the power and efficiency test sequence.

13. The method for diagnosing problems in a hydrostatic transmission as set forth in claim 8, wherein the test sequence includes a test for charge pressure.

14. The method for diagnosing problems as set forth in claim 13, for the hydrostatic transmission, wherein neutral charge relief pressure, operating relief pressure, and minimum charge pressure can all be tested as part of the charge pressure sequence.

15. The method for diagnosing problems in a hydrostatic transmission as set forth in claim 8, wherein the test sequence includes checking motor shifts of the hydrostatic transmission.

16. The method for diagnosing problems in a hydrostatic transmission as set forth in claim 15, wherein hydrostatic motor minimum and maximum angles and motor displacement control valve can be tested as part of the motor shift test sequence.

17. The method for diagnosing problems in a hydrostatic transmission as set forth in claim 8, wherein the test sequence includes checking pump and motors of the hydrostatic transmission.

18. The method for diagnosing problems in a hydrostatic transmission as set forth in claim 17, wherein pressure control pilot, pump servo pressure, and pump displacement control valve null adjustment can all be tested as part of the pumps and motors test sequence.

19. A method for diagnosing problems in a hydrostatic transmission of a vehicle, comprising the steps of:
providing a hydrostatic transmission, a transmission control unit that includes a monitor capable of receiving input commands from an operator and pressure sensors and at least one temperature sensor connectable between diagnostic hose ports coupled to the transmission and inputs on the transmission control unit;
providing data inputs on the transmission control unit for connection of the sensors;
selecting a symptom or problem area to be checked on the monitor;
initiating a test sequence by input command on the monitor;
performing calculations in the transmission control unit based upon data inputs from the sensors to determine a hydraulic problem; and
providing directions for adjustments or replacing parts on the hydrostatic transmission.

20. The method for diagnosing problems as set forth in claim 19, including the step of relocating existing pressure sensor connections.

21. The method for diagnosing problems as set forth in claim 20, wherein the monitor provides instructions for relocating the pressure sensors based upon the symptom or problem area selected on the monitor.

22. The method of claim 1, further comprising the step of providing instructions on the monitor for shifting the transmission into one of neutral, forward, and reverse.

23. The method of claim 1, further comprising the step of providing instructions on the monitor for adjusting an idle speed of the engine.

24. The method of claim 19, further comprising the step of providing instructions on the monitor for shifting the transmission into one of neutral, forward, and reverse.

25. The method of claim 19, further comprising the step of providing instructions on the monitor for adjusting an idle speed of the engine.

26. A diagnostic system comprising:
a hydrostatic transmission;
a transmission control unit;
a monitor having a test function and a symptom or problem area, which are selectable by an operator, the monitor configured to initiate a test sequence by an input command on the monitor; and
a plurality of pressure sensors connectable between diagnostic hose ports coupled to the transmission and inputs on the transmission control unit;
wherein the transmission control unit is configured to:
perform calculations based upon data from the pressure sensors to determine a hydraulic problem; and
provide directions for adjustments or replacing parts on the hydrostatic transmission.

27. The diagnostic system of claim 26, wherein the pressure sensors are relocatable based upon instructions to the operator in accordance with the symptom or problem area selected.

28. The diagnostic system of claim 26, wherein the directions from the transmission control unit are readable on the monitor.

29. The diagnostic system of claim 26, further including a hydrostatic integrated circuit manifold coupled to the hydrostatic transmission and including diagnostic test ports to which the pressure sensors can be connected.

30. The diagnostic system of claim 26, wherein selecting the test function on the monitor menu generates a screen display from which the symptom or problem area may be selected.

31. The diagnostic system of claim 26, wherein the test sequence is selected from a warm-up test sequence, a power and efficiency test sequence, a charge pressure test sequence, a motor shifts test sequence, and a pumps and motor test sequence.

32. The diagnostic system of claim 31, wherein:
the warm-up test sequence checks a park brake and a cooler bypass operation;
the power and efficiency test sequence checks a multifunction relief check, transmission efficiency tests, engine low power tests, and a cooling capacity check;
the charge pressure test sequence checks a neutral charge for relief pressure, an operating charge relief pressure, and a minimum charge releasing pressure;
the motor shifts test sequence checks a hydrostatic motor minimum and maximum angles of a motor displacement control valve; and
the pumps and motors test sequence checks a pressure control pilot, a pump servo pressure, and a pump displacement control valve null adjustment.

33. The diagnostic system of claim 26, wherein the transmission control unit provides directions based upon the input command and the data from the pressure sensors without the need to reference external documents or use external devices.

34. The diagnostic system of claim 33, wherein the pressure sensors are relocatable based upon instructions to the operator in accordance with the symptom or problem area selected.

* * * * *

UNITED STATES PATENT AND TRADEMARK OFFICE
CERTIFICATE OF CORRECTION

PATENT NO. : 9,291,523 B2
APPLICATION NO. : 11/890604
DATED : March 22, 2016
INVENTOR(S) : William Damm Zopf Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2324 days.

Signed and Sealed this
Fourteenth Day of June, 2016

Michelle K. Lee
*Director of the United States Patent and Trademark Office*